US008185115B2

(12) United States Patent
Nader

(10) Patent No.: US 8,185,115 B2
(45) Date of Patent: May 22, 2012

(54) TRACKING CELLS FOR CELL-RESELECTION IN A CELLULAR COMMUNICATIONS SYSTEM

(75) Inventor: Ali Nader, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 173 days.

(21) Appl. No.: 12/765,951

(22) Filed: Apr. 23, 2010

(65) Prior Publication Data

US 2011/0263254 A1 Oct. 27, 2011

(51) Int. Cl.
*H04W 36/00* (2009.01)
(52) U.S. Cl. ........... 455/436; 455/434; 455/435.1; 455/435.2; 455/513; 370/331; 370/332; 370/335
(58) Field of Classification Search ......... 455/422.1, 455/423–425, 432.1, 434, 435.1, 435.2, 435.3, 455/436–444, 446, 456.1, 458, 464, 509, 455/512, 513, 515, 522, 524, 525, 115.1, 455/115.2, 115.3, 134, 161.1, 161.3, 226.1, 455/226.2; 370/252, 310, 310.2, 312, 318, 370/320, 328, 331–333, 335, 342, 491, 500
See application file for complete search history.

(56) References Cited

U.S. PATENT DOCUMENTS

| | | | |
|---|---|---|---|
| 4,718,081 A | | 1/1988 | Brenig |
| 5,509,051 A * | | 4/1996 | Barnett et al. ............. 455/443 |
| 6,771,960 B1 * | | 8/2004 | Otting et al. ............. 455/434 |
| 7,013,141 B2 * | | 3/2006 | Lindquist et al. ......... 455/435.1 |
| 7,062,271 B2 * | | 6/2006 | Choi ....................... 455/434 |
| 7,110,766 B1 | | 9/2006 | Tayloe et al. |
| 7,308,264 B2 * | | 12/2007 | Stern-Berkowitz et al. .. 455/442 |
| 7,373,148 B2 * | | 5/2008 | Kim et al. ................. 455/437 |
| 7,415,277 B2 * | | 8/2008 | Okuyama ................. 455/436 |
| 7,444,150 B2 * | | 10/2008 | Rick et al. ............... 455/436 |
| 8,045,989 B2 * | | 10/2011 | Joo ......................... 455/446 |
| 2007/0173255 A1 | | 7/2007 | Tebbit et al. |

(Continued)

FOREIGN PATENT DOCUMENTS

EP 1670278 A1 6/2006

(Continued)

OTHER PUBLICATIONS

PCT International Search Report, dated Aug. 16, 2011, in connection with counterpart International Application No. PCT/EP2011/055002.

(Continued)

*Primary Examiner* — Anthony Addy
(74) *Attorney, Agent, or Firm* — Potomac Patent Group PLLC

(57) ABSTRACT

A user equipment (UE) in a cellular communication system tracks neighbor cells by periodically performing a signal measurement process and periodically performing a signal tracking process. Neighbor cells are ranked according to measured signal level, and the number of cells that are tracked is variable, and is based on the stability of the radio environment in which the UE is operating. The rate at which a neighbor cell changes from the status of not being the strongest neighbor cell to the status of being one is an indicator of environment stability. When a neighbor cell newly becomes the strongest ranking neighbor cell, the ranking that that neighbor cell had a predetermined time period ago can be used as an indicator of how many neighbor cells to track. The predetermined time period can be an average amount of time that it takes to track a neighbor cell.

18 Claims, 6 Drawing Sheets

U.S. PATENT DOCUMENTS

| | | | |
|---|---|---|---|
| 2007/0270148 A1* | 11/2007 | Yeh et al. | 455/436 |
| 2008/0167041 A1 | 7/2008 | Wang et al. | |
| 2009/0156210 A1 | 6/2009 | Ponce De Leon et al. | |
| 2009/0239535 A1* | 9/2009 | Chun et al. | 455/435.2 |
| 2009/0318155 A1* | 12/2009 | Fukuzawa et al. | 455/438 |
| 2010/0203891 A1* | 8/2010 | Nagaraja et al. | 455/436 |

FOREIGN PATENT DOCUMENTS

| | | |
|---|---|---|
| EP | 1 804 532 A1 | 7/2007 |
| EP | 1405538 B1 | 9/2009 |
| WO | 99/05878 A1 | 2/1999 |
| WO | 02/37875 A1 | 5/2002 |
| WO | 03/005759 A1 | 1/2003 |
| WO | 2005/039230 A1 | 4/2005 |
| WO | 2008/066582 A1 | 6/2008 |

OTHER PUBLICATIONS

PCT Written Opinion, dated Aug. 16, 2011, in connection with counterpart International Application No. PCT/EP2011/055002.

* cited by examiner

TRACKING CELLS FOR CELL-RESELECTION IN A CELLULAR COMMUNICATIONS SYSTEM

BACKGROUND

The present invention relates to cellular communications systems, and more particularly to methods and apparatuses for tracking cells to facilitate cell-reselection in a cellular communication system A user equipment (UE) operating in a cellular system such as a system compliant with the Global System for Mobile Communications (GSM) selects the most suitable cell to camp on when it is first powered up. (As used herein, the terms "cell" and the base station or equivalent network node that serves that cell are used synonymously.) Once a UE is camped on a cell and is not engaged on an ongoing call, it monitors its neighboring cells for a possible cell reselection. This procedure is periodically performed on an ongoing basis in order to ensure that the UE is camped on the most suitable cell in its vicinity. There are other reasons for cell reselection but they are not essential for understanding the present invention.

FIG. 1 illustrates an exemplary arrangement in which these various procedures are performed. (As used herein, the term "exemplary" means "serving as an illustration".) A cellular communications system 100 includes a number of cells, including a cell 101 that serves a UE 103. Neighbor cells of the UE 103 include the neighbor cells 105, 107, 109, 111, 113, 115, 117, and 119. The UE 103 is camped on the cell 101, and monitors some group of the neighbor cells 105, 107, 111, 113, 115, 117, 119 for a possible cell reselection.

According to the 3rd Generation Partnership Project (3GPP) specification (in particular, 3GPP specification 45.008 chapter 6), a UE operating in GSM mode, while in idle mode, monitors cells by performing measurements on, and reading relevant Broadcast Control Channel (BCCH) data from, the UE's serving cell and the six strongest neighboring cells. By the term "six strongest" is meant the six neighbor cells that have the highest measured received signal level (called RXLEV hereafter). How these measurements are performed and averaged is well defined and known to those of ordinary skill in the art. Therefore, there is no need to describe these procedures in further detail in this document.

With respect to monitoring the neighbor cells, it is conventional for the following activities to be performed during each occurrence of an idle mode state within the UE:

RXLEV measurements are repeatedly made on neighboring cells, and from these measurements the six strongest neighbors are identified.

For each of the six strongest neighbor cells, in order to ensure that the cell currently being tracked is the intended cell, Base Station Identification Code (BSIC) checks are made, including checking the synchronization of the frequency channel (FCH) and the synchronization channel (SCH). The standards require the UE to attempt to check the BSIC for each of the six strongest cells at least once every 30 seconds, in order to confirm that it has not inadvertently started monitoring the strength of a different cell.

For each of the six strongest neighbor cells, the Broadcast Control Channel (BCCH) is read in order to capture relevant data that is needed for cell reselection. If the serving cell does not provide all of the parameters affecting cell reselection, then the specifications require the UE to capture relevant BCCH data for each of the six strongest neighbor cells at least once every five minutes.

Additionally, if the UE lacks relevant information for a neighbor cell that has newly been identified as being among the six strongest neighbor cells, then the UE is required to decode the BCCH data for that newly identified cell within 30 seconds.

It is desirable to enable UEs to achieve desired neighbor cell monitoring performance goals in as efficient a manner as possible.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for tracking neighbor cells of a user equipment operating in a serving cell in a mobile communication system. Such techniques involve operating the user equipment to periodically perform a signal measurement process and operating the user equipment to periodically perform a neighbor tracking process. The signal measurement process comprises ascertaining a received signal level for each of a number of the neighbor cells. The received signal levels are compared with one another to ascertain, for each of the neighbor cells, a present ranking indicative of the neighbor cell's received signal level relative to the received signal levels of other neighbor cells, wherein a neighbor cell having the strongest received signal level has a ranking of "first" and is denoted a present candidate for cell reselection. For each of the neighbor cells, the present ranking is compared with a previous ranking of the neighbor cell and if the present ranking and the previous ranking are not the same, then a timestamp is associated with the neighbor cell, wherein the timestamp indicates a time that the neighbor cell's present ranking was ascertained. It is then ascertained whether the ranking of any neighbor cell has changed from an earlier ranking of $(AMT_{Track}+m)^{TH}$ strongest received signal level to a present ranking equal to $(AMT_{Track})^{TH}$ strongest received signal level, wherein represents an ordinal number corresponding to a cardinal number "...", $AMT_{Track}$ is a cardinal integer greater than or equal to 1, and m is a cardinal integer greater than or equal to 1. If the ranking of any neighbor cell has changed from the earlier ranking of $(AMT_{Track}+m)^{TH}$ strongest received signal level to a present ranking equal to $(AMT_{Track})^{TH}$ strongest received signal level then an information collection process is immediately invoked to be performed for the neighbor cell having the present ranking equal to $(AMT_{Track})^{TH}$ strongest received signal level.

Furthermore, operating the user equipment to periodically perform the neighbor tracking process that comprises ascertaining whether the present candidate for cell reselection is a same one of the neighbor cells as a previous candidate for cell reselection includes, if the present candidate for cell reselection is the same as the previous candidate for cell reselection, then performing an information collection process for only those ones of the neighbor cells presently ranked first through $(AMT_{Track})^{TH}$. If the present candidate for cell reselection is not the same as the previous candidate for cell reselection then a tracking adjustment process is performed followed by the information collection process for only those ones of the neighbor cells presently ranked first place through $(AMT_{Track})^{TH}$. The tracking adjustment process comprises determining a rate at which the ranking of the present candidate for cell reselection changed from a ranking of $(1+i)^{TH}$ to a ranking equal to $1^{st}$, wherein i is an integer greater than or equal to 1. The value of $AMT_{Track}$ is adjusted such that the higher the rate at which the present candidate for cell reselection changed from the ranking of $(1+i)^{TH}$ to the ranking equal to $1^{st}$, the larger the value of $AMT_{Track}$.

In some embodiments, operating the user equipment to periodically perform the signal measurement process comprises ascertaining whether the ranking of any neighbor cell has changed from an earlier ranking of $(AMT_{Track}+m)^{TH}$ strongest received signal level to a present ranking of $(AMT_{Track}-n)^{TH}$ strongest received signal level, wherein n is an integer greater than or equal to 1, and if the ranking of any neighbor cell has changed from the earlier ranking greater of $(AMT_{Track}+m)^{TH}$ strongest received signal level to the present ranking of $(AMT_{Track}-n)^{TH}$ strongest received signal level then immediately invoking the information collection process to be performed for the neighbor cell having the present ranking of $(AMT_{Track}-m)^{TH}$ strongest received signal level.

In another aspect of some embodiments, determining the rate at which the ranking of the present candidate for cell reselection changed from the ranking of $(1+i)^{TH}$ to a ranking equal to $1^{st}$ comprises ascertaining a current time value $t_{current}$; ascertaining a past time value, $t_{past}$, that occurred a predetermined amount of time prior to the current time; and ascertaining the ranking that the present candidate for cell reselection had at the past time, $t_{past}$. Also, adjusting the value of $AMT_{Track}$ such that the higher the rate at which the present candidate for cell reselection changed from the ranking of $(1+i)^{TH}$ to the ranking equal to $1^{st}$, the larger the value of $AMT_{Track}$ comprises setting $AMT_{Track}$ to a value representing the cardinal number corresponding to the ranking that the present candidate for cell reselection had at the past time, $t_{past}$.

In still another aspect of some embodiments, the predetermined amount of time is determined by ascertaining an average amount of time it takes to perform the information collection process for one neighbor cell.

In yet another aspect of some embodiments, the information collection process comprises, for any one of the neighbor cells, obtaining a base station identification code and capturing broadcast control channel information that has been broadcast by the neighbor cell.

In still another aspect of some embodiments, adjusting the value of $AMT_{Track}$ comprises capping the value of $AMT_{Track}$ to no more than a fixed maximum amount of neighbor cells to be tracked. For example, the fixed maximum number of neighbor cells to be tracked can be set equal to six.

In yet another aspect of some embodiments, adjusting the value of $AMT_{Track}$ comprises ensuring that the value of $AMT_{Track}$ is not lower than a predefined fixed minimum amount of neighbors to be tracked. For example, the predefined fixed minimum amount of neighbors to be tracked can be set equal to two.

BRIEF DESCRIPTION OF THE DRAWINGS

The objects and advantages of the invention will be understood by reading the following detailed description in conjunction with the drawings in which.

DETAILED DESCRIPTION

Figure 1:
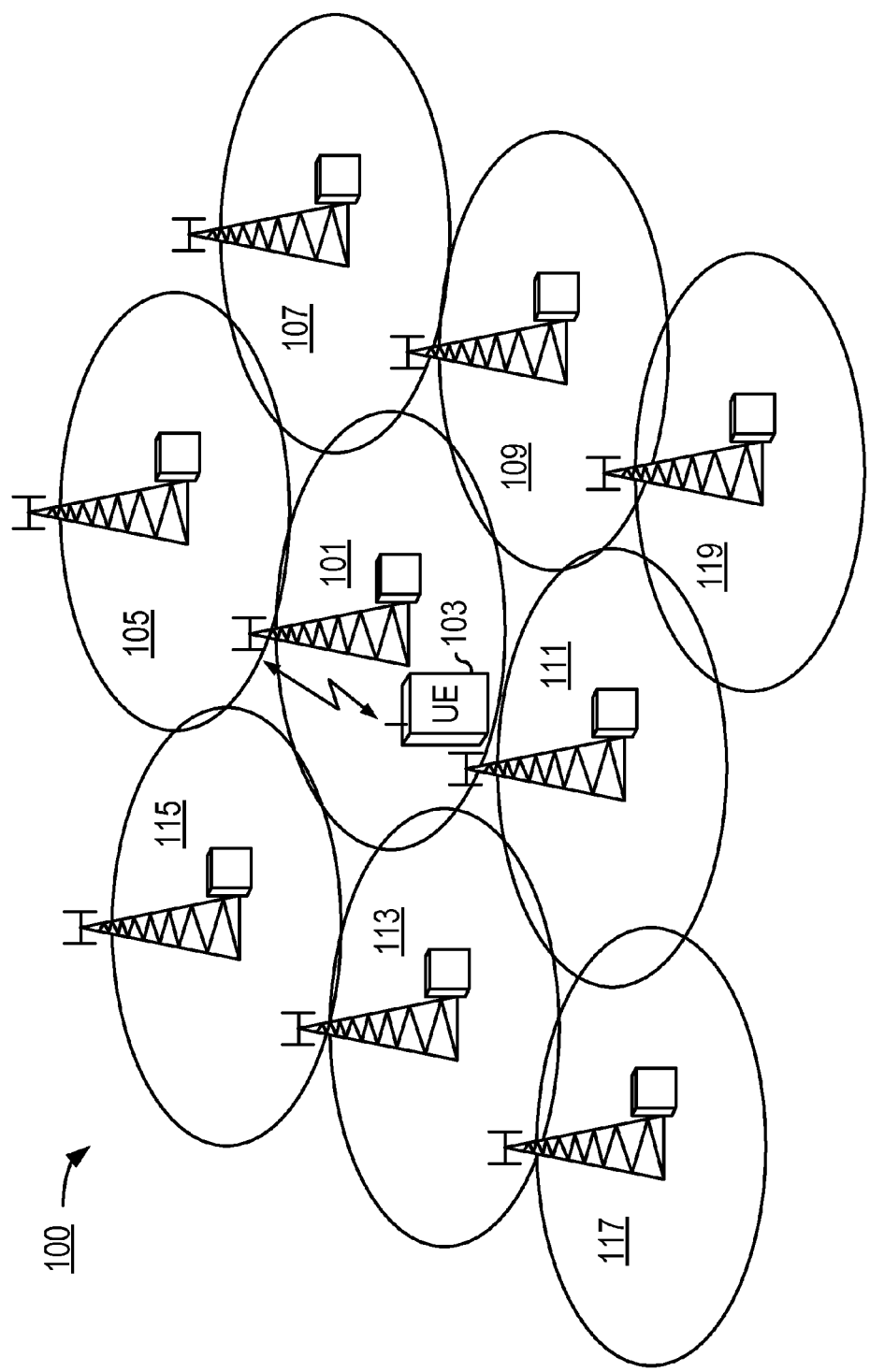
FIG. 1 is a block diagram of an exemplary cellular communications system arrangement, including a UE, in which various aspects of the invention can be practiced.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

The inventor of the subject matter described herein has recognized that strict compliance with neighbor cell monitoring standards as described earlier leads to unnecessary processing and radio "on" time that is not always fruitful and ends up only wasting a UE's resources (e.g., processing capacity and battery power).

More specifically, the standards regarding cell neighbor cell monitoring call for what can conceptually be considered to comprise two different types of activities: 1) the making of signal level measurements (RXLEV measurements) of all detectable neighbor base stations to ascertain which six have the strongest signal levels and 2) a neighbor cell tracking process that includes an information collection process (e.g., performing the BSIC check and BCCH update processes) applied to the six strongest neighbor cells. The first activity (i.e., RXLEV measurements) can be accomplished at very little cost to the UE's resources, and therefore does not call out for ameliorative steps to be taken. For example, a UE, when in idle mode operating in Discontinuous Reception mode (DRX mode), can perform the neighbor cell signal level measurements during the frames of the serving cell's paging block that the UE is required to listen to anyway. Hence, no additional radio resources are needed to comply with this aspect of the neighbor cell tracking requirements.

However, with respect to the information collection activities (i.e., repeated BSIC checking and BCCH updating), the inventor of the presently described subject matter has ascertained that, in practical embodiments, the rate at which system information (information on the BCCH) changes is much slower than the "once every 5 minutes" rate that is called for in the specifications. To the contrary, once a base station is tuned in by an operator, its system information is, in a practical sense, almost never changed.

The inventor of the subject matter described herein has further ascertained that designing a system to always operate as though it is experiencing worst case conditions leads to inefficiencies. For example, it is not very likely for a sixth strongest neighbor cell to suddenly become the best candidate for cell reselection (i.e., the neighbor cell having the strongest measured signal level). Hence, although it is specified in, for example, the 3GPP specifications, the constant updating of BSIC and BCCH of the six strongest neighbor cells is usually wasteful of UE resources in practical embodiments.

The various aspects of the invention address these various inefficiencies as outlined above. Here it will be appreciated that, to facilitate an understanding of the various aspects of the invention by those of ordinary skill in the art, the various examples presented herein are set forth in the context of the 3GPP specifications whose terminology and system configurations are well known. However, the various aspects of the invention are not limited to only 3GPP embodiments, and are instead applicable to any cellular communications system having not necessarily identical but comparable neighbor cell tracking requirements.

In one aspect, a UE's operation is made more efficient by reducing activities associated with the neighbor cell information collection process. One could, for example, track a lower number of neighbor cells and hence consume less battery and processing power. However, if this is achieved by means of static approaches (e.g., always collecting information relating to only the strongest three instead the strongest six neighbor cells), it remains a problem to find the optimum number of cells to track that will both save power and also achieve good performance in unstable radio conditions. There is always a trade-off between how many cells to track and how much power to save. The fewer cells tracked, the less processing, the less radio-on time and hence the less power consumed. Along with these savings comes the risk that a cell that has not been tracked will suddenly become a candidate for cell reselection. As a result of not having tracked this cell, there will surely be a delay in the cell reselection process because the UE will need to perform the tracking steps at a late stage, and this delay poses a potential risk of losing coverage.

Hence, it is desired to implement efficient neighbor cell monitoring approaches while at least achieving levels of performance comparable to those that would be achieved if the implementation strictly complied with the specifications (e.g., always tracking the six strongest neighbor cells as called for in the 3GPP specifications). To take an example, a UE operating in a radio environment such as Hong Kong can find that a sixth strongest cell has suddenly become the strongest neighbor cell and is therefore an immediate candidate for cell reselection, even though in most places this would be unlikely to occur. The strategy to be adopted should not perform worse than a standards-compliant strategy.

To address the problem of not knowing what constitutes the optimal number of neighbor cells to track, an aspect of embodiments consistent with the invention involves tracking only that number of neighbor cells that is statistically shown to be needed for the current radio conditions experienced by the UE. The number of neighbor cells that are tracked is therefore dynamically adapted in response to the UE's detected environment. Hence, in a stable radio environment, very few neighbor cells are tracked (perhaps even fewer than the three strongest neighbors) and in an unstable radio environment, more cells are tracked (e.g., four, five, or six depending on the experience that the UE has built up). These and other aspects are further described in connection with the following exemplary embodiments.

Principles upon which embodiments consistent with the invention operate include ascertaining, for a specific UE and the area it is moving around in: 1) how long it takes to track a cell; and 2) how stable the radio environment is (e.g., how quickly a neighbor cell's detected status changes from that of not being a candidate for cell selection to being one. By keeping track of these two parameters, a UE only needs to track cells that may become a candidate for reselection faster in time compared to the time it takes to perform the tracking operations. This way the UE can make sure that it is tracking just enough cells to maintain a desired performance level while, at the same time, minimizing the risk of a candidate for cell reselection not having been tracked prior to its becoming a candidate for cell reselection.

Figure 2:
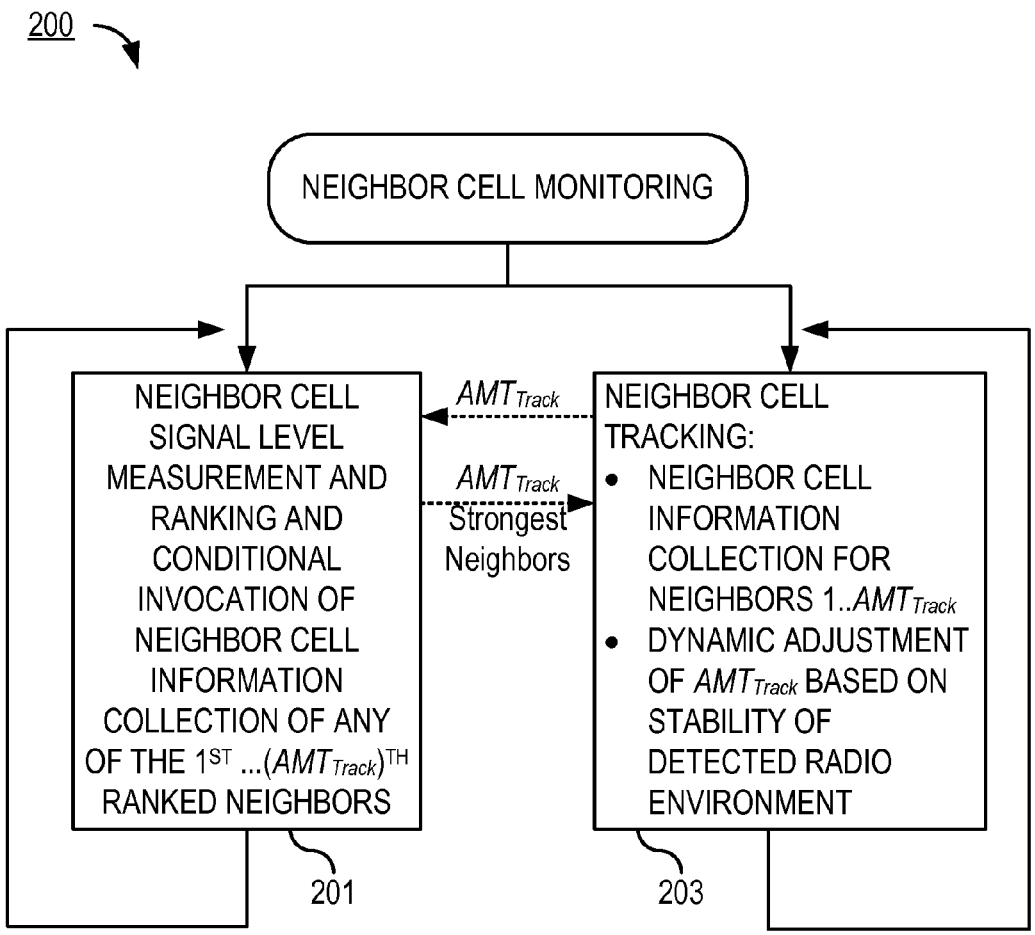
FIG. 2 is, in one respect, a flow diagram of processes that are performed by UE circuitry to perform the neighbor cell monitoring processes.

FIG. 2 is, in one respect, a flow diagram of processes that are performed by UE circuitry to perform the neighbor cell monitoring processes (i.e., signal level measuring and information collection). In another respect, FIG. 2 is a high level block diagram of circuitry 200 in a UE (e.g., the UE 103) comprising circuitry configured to carry out the described functions. To take a non-limiting example, each illustrated block of circuitry can be implemented by means of a one or more processors combined with suitable program code adapted to cause the one or more processors to carry out the described function(s).

At a high level, embodiments consistent with the invention can be considered to comprise two processes/circuitry that operate concurrently. A first "measurement" process measures signal levels of some number of neighbor cells (e.g., all detectable neighbor cells), and then ranks these according to measured signal level (step 201). Throughout this disclosure, rankings are expressed as ordinal numbers (e.g., "first", "second", "third", . . . ), with each ordinal number having a corresponding cardinal number (e.g., the number "1" corresponds to the ordinal number "first"; the number "2" corresponds to the ordinal number "second", . . . ). In the exemplary embodiments presented herein, a ranking of "first" (also written as "$1^{st}$") means that a neighbor cell's received signal level is the strongest among all of the measured neighbor cells; a ranking of "second" (also, "$2^{nd}$") means that a neighbor cell's received signal level is the second strongest among all of the measured neighbor cells (i.e., the signal level is surpassed only by that of the "first" ranked neighbor cell), and so on. It is recognized that equivalent embodiments could be described and implemented in which the "first" ranked neighbor cell could be that having the weakest signal level, the "second" ranked neighbor cell is the one having the next weakest signal level, and so on. However, the first approach is easier to describe, and is therefore used throughout this document. It should be understood that any reference to aspects of the first approach are intended also to refer to the equivalent aspects that would be expressed in the alternative ranking strategy.

This "measurement" process 201 is aware that the number of neighbor cells being tracked (i.e., the number of neighbor cells for which information collection is performed) is dynamically adjustable, with the adjustment being made by a second "tracking" process 203 to be described below. The number of neighbor cells being tracked is herein denoted by the variable number $AMT_{Track}$, which is a cardinal integer greater than or equal to 1. The particular ones of the neighbor cells that are tracked are those whose present ranking falls within the range $1^{st} \ldots (AMT_{Track})^{TH}$, wherein "$(\ldots)^{TH}$" denotes the ordinal number corresponding to the cardinal number enclosed within the brackets. The value of $AMT_{Track}$ is determined by the neighbor cell tracking process 203 and provided to the neighbor cell measurement process 201. The neighbor cell management process 201 in turn provides the neighbor cell tracking process 203 with information identifying which neighbor cells are presently ranked $1^{st} \ldots (AMT_{Track})^{TH}$.

The repetition rate of the neighbor cell measurement process 201 is independent of that of the neighbor cell tracking process 203, which includes a neighbor cell information collection process. However, the neighbor cell measurement process does, under certain circumstances, also cause the information collection process to be "immediately" invoked for any one or more of those neighbor cells that are presently ranked $1^{st} \ldots (AMT_{Track})^{TH}$. The particular circumstances under which this happens are described in detail below in connection with FIG. 3. It should be understood that, as used herein, the term "immediately" is not used in the strict sense to mean "instantly without delay." Rather, by "immediately" is herein meant that although there may in fact be some delay between determining that neighbor cell collection should be invoked and the actual performance of neighbor cell collection, that performance is caused to happen without waiting for the normally scheduled time associated with the repeatedly performed neighbor cell process 203.

The neighbor cell tracking process/circuitry 203, as mentioned above, performs neighbor cell information collection for those neighbor cells that are presently ranked $1^{st} \ldots (AMT_{Track})^{TH}$. The neighbor cell tracking process/circuitry 203 also dynamically adjusts the value of $AMT_{Track}$ based on the stability of the UE's detected radio environment. The neighbor cell tracking process 203 is performed repeatedly at a rate independent of that of the neighbor cell signal level measurement process 201.

Figure 3:
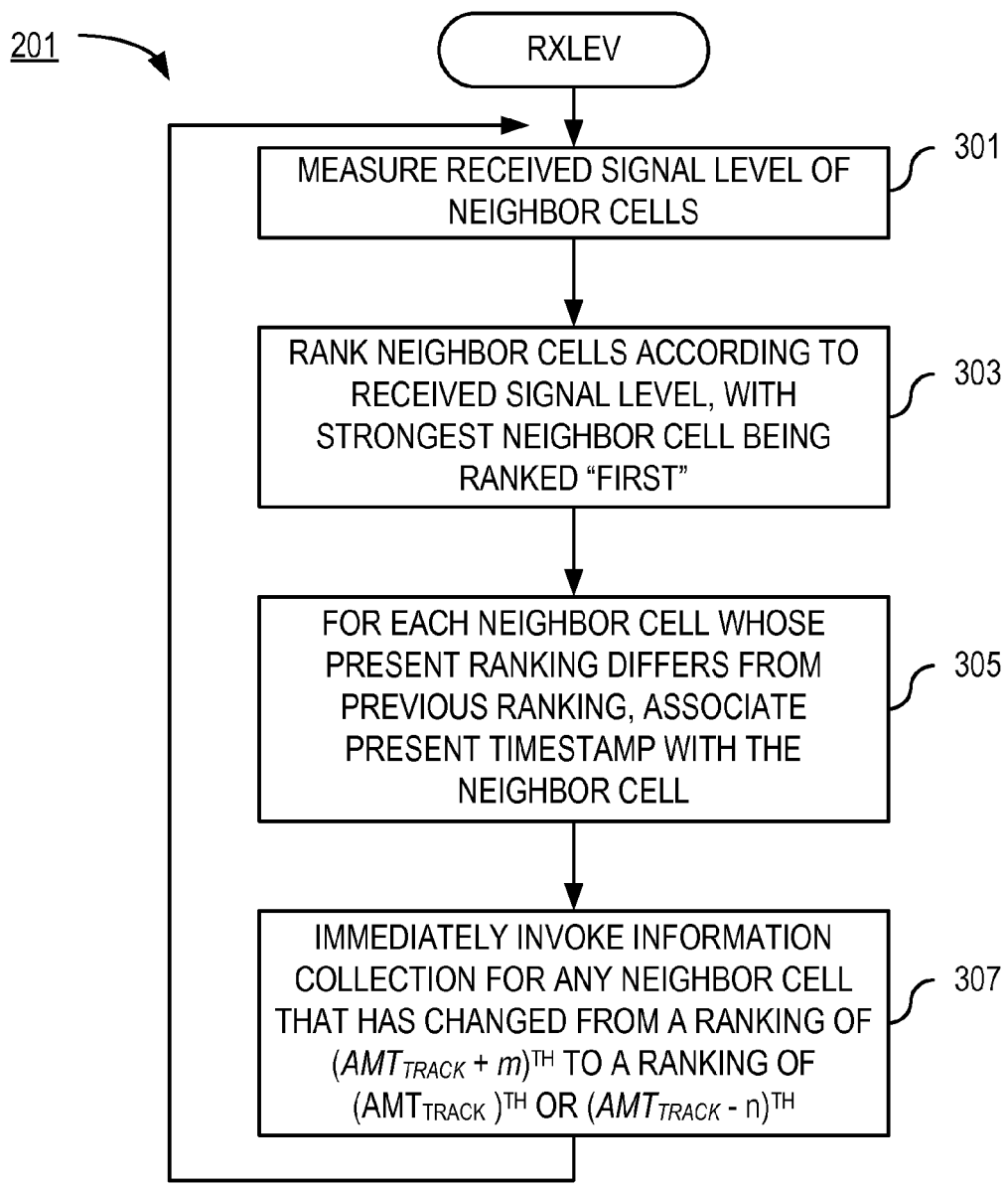
FIG. 3 is, in one respect, a flow diagram of processes that are performed by UE circuitry to perform the neighbor cell measurement process.

An exemplary embodiment of the neighbor cell measurement process/circuitry 201 will now be described in further detail with reference to FIG. 3, which is, in one respect, a flow diagram of processes that are performed by UE circuitry to perform the neighbor cell measurement process 201. In another respect, FIG. 3 is a block diagram of circuitry 201 in a UE (e.g., the UE 103) comprising circuitry configured to carry out the described functions. To take a non-limiting example, each illustrated block of circuitry can be implemented by means of a one or more processors combined with suitable program code adapted to cause the one or more processors to carry out the described function(s).

In one aspect, the received signal level of a number of neighbor cells is measured (step 301). Circuitry and techniques for making such measurements are well known in the art and therefore need not be described herein in further detail. The number of cells that are measured is not limited to only those being tracked, but can, for example, include all detectable neighbor cells.

The neighbor cells are then ranked according to their corresponding received signal level, with the strongest neighbor cell being ranked "first", the next strongest neighbor cell being ranked "second", and so on (step 303). Ranking, therefore, involves comparing the measured receive signal levels with one another to ascertain an ordering of the received signal levels from strongest to weakest and thereby to ascertain, for each of the neighbor cells, a present ranking indicative of the neighbor cell's received signal level relative to the received signal levels of other neighbor cells. In alternative embodiments, the ordering can be from weakest to strongest. (As stated before, the exemplary embodiments presented herein assume a ranking from strongest to weakest, but those of ordinary skill in the art will readily be able to derive alternative embodiments based on a ranking from weakest to strongest.) The neighbor cell having the strongest measured signal level (i.e., in this exemplary embodiment, the "first" ranked neighbor cell) is denoted a candidate for cell reselection.

Another aspect of embodiments consistent with the invention involves maintaining a history of a particular cell's ranking over time. This will be used to determine a rate at which a neighbor cell has ascended to the "first" ranked position within the ranking. In the exemplary embodiment, this history is created by identifying each neighbor cell whose present ranking differs from its previous ranking, and for each of those identified neighbor cells, associating a present timestamp with the neighbor cell and its present ranking (step 305), wherein the timestamp indicates a time that the neighbor cell's present ranking was ascertained. In alternative embodiments, in order to reduce the processing associated with this activity, the number of neighbor cells for which timestamp histories are maintained can be capped at a maximum number, such as the number of neighbor cells that are supposed to be tracked according to standards (e.g., maintaining histories for no more than the six strongest cells as set forth in the 3GPP standards). As used herein, the term "cap" means "to set an upper limit on."

Next, the circuitry ascertains whether the ranking of any neighbor cell has changed from an earlier ranking of $(AMT_{Track}+m)^{TH}$ strongest received signal level to a present ranking equal to $(AMT_{Track})^{TH}$ strongest received signal level, wherein $AMT_{Track}$ is a cardinal integer greater than or equal to 1, and m is a cardinal integer greater than or equal to 1, and if any such neighbor cell is identified, then the circuitry "immediately" invokes an information collection process to be performed for the neighbor cell having the present ranking equal to $(AMT_{Track})^{TH}$ strongest received signal level (step 307). The rationale here is that a neighbor cell whose ranking was previously $(AMT_{Track}+m)^{TH}$ has not already been tracked (i.e., its information has not been collected in the most recent performance of the neighbor cell tracking process 203). Now that such a neighbor cell has become the $(AMT_{Track})^{TH}$ strongest neighbor cell, information collection should be performed as soon as possible because it could quickly rise to the position of being the strongest (i.e., $1^{st}$ place) neighbor cell.

In some but not necessarily all embodiments, it is further advantageous to detect when a neighbor cell has increased in relative strength so quickly that it has changed from a previous ranking of $(AMT_{Track}+m)^{TH}$ to a ranking even stronger than $(AMT_{Track})^{TH}$, that is, to a ranking of $(AMT_{Track}-n)^{TH}$, wherein n is an integer greater than or equal to "1". If such a neighbor cell is identified, then the circuitry "immediately" invokes an information collection process to be performed for the neighbor cell having the present ranking equal to $(AMT_{Track}-n)^{TH}$ strongest received signal level (step 307).

The neighbor cell measurement process is repeated periodically, as indicated in FIG. 3 by the arrow from step 307 to step 301.

Figure 4:
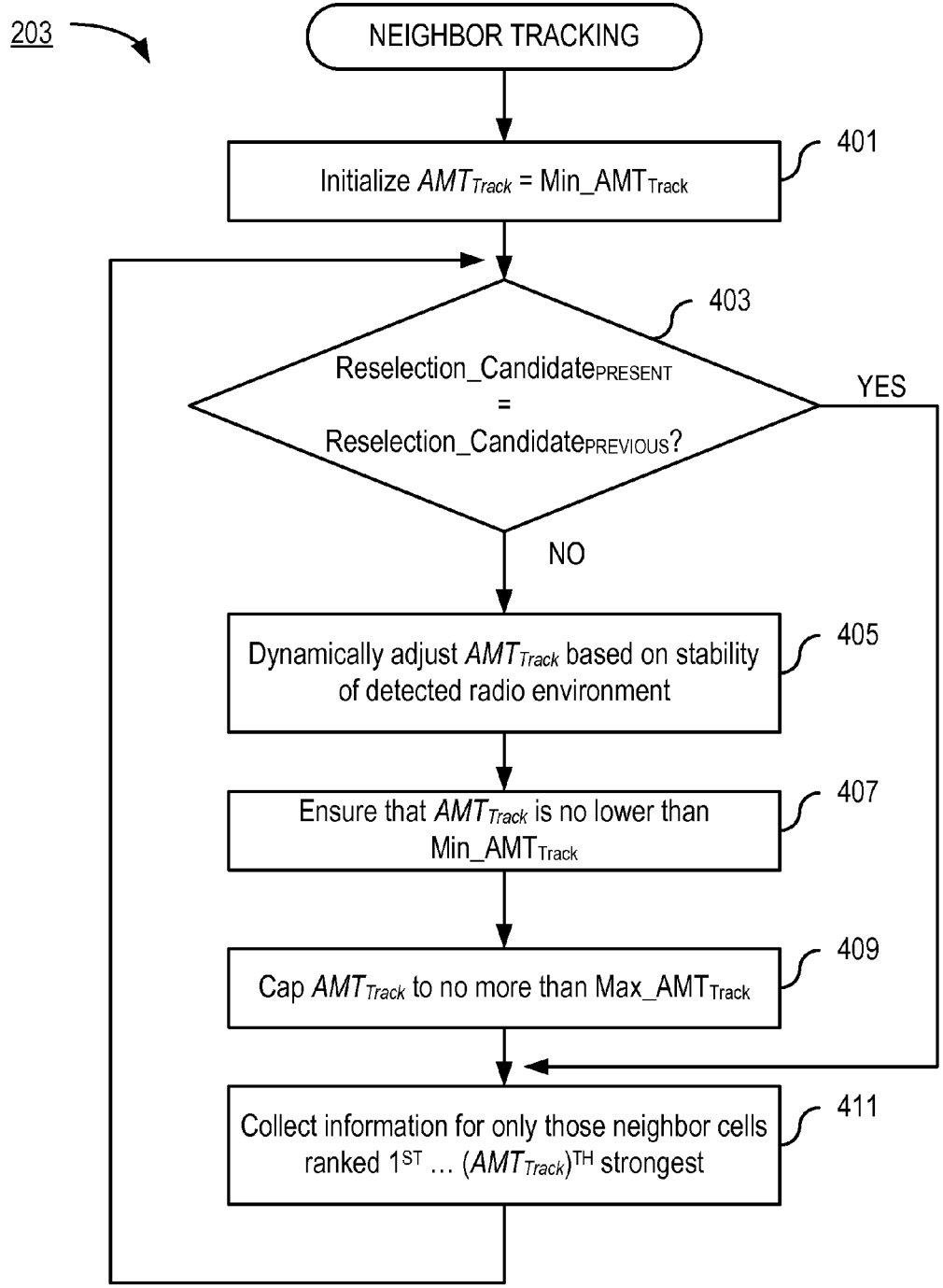
FIG. 4 is, in one respect, a flow diagram of processes that are performed by UE circuitry to perform the neighbor cell tracking process.

An exemplary embodiment of the neighbor cell tracking process/circuitry 203 will now be described in further detail with reference to FIG. 4, which is, in one respect, a flow diagram of processes that are performed by UE circuitry to perform the neighbor cell tracking process 203. In another respect, FIG. 4 is a block diagram of circuitry 203 in a UE (e.g., the UE 103) comprising circuitry configured to carry out the described functions. To take a non-limiting example, each illustrated block of circuitry can be implemented by means of a one or more processors combined with suitable program code adapted to cause the one or more processors to carry out the described function(s).

In an initializing step, the value of $AMT_{Track}$ is set equal to an initial value (step 401), such as a value, $Min\_AMT_{Track}$, representing a minimum number of neighbor cells that should be tracked. In exemplary embodiments, $Min\_AMT_{Track}$ can be equal to "2", but this can be different in alternative embodiments.

In one aspect, the circuitry ascertains whether the present candidate for cell reselection ("Reselection_Candidate$_{PRESENT}$") is a same one of the neighbor cells as a previous candidate for cell reselection ("Reselection_Candidate$_{PREVIOUS}$") (decision block 403). If it is not ("NO" path out of decision block 403), then a tracking adjustment process is performed (step 405) that dynamically adjusts the number of neighbor cells to be tracked (i.e., the value of $AMT_{Track}$) based on the stability of the detected radio environment. Following adjustment, some embodiments may require that it be ensured that the adjusted value of $AMT_{Track}$ is not less than the minimum number of neighbor cells to track, $Min\_AMT_{Track}$ (step 407).

In some, but not necessarily all embodiments, it may be further desired to cap the number of neighbor cells to track to some maximum number, $Max\_AMT_{Track}$. For example, in 3GPP-compliant embodiments, it may be advantageous to let $Max\_AMT_{Track}$ have a value of "6", in correspondence with the number of neighbor cells that would conventionally be tracked. In such embodiments, a further step of capping the adjusted value, $AMT_{Track}$ to be no more than the maximum number, $Max\_AMT_{Track}$, is performed (step 409).

This tracking adjustment process is followed by an information collection process for only those ones of the neighbor cells presently ranked $1^{st}$ through $(AMT_{Track})^{TH}$ (step 411).

If the present candidate for cell reselection is the same as the previous candidate for cell reselection ("YES" path out of decision block 403) then the tracking adjustment process is skipped and processing proceeds to the information collection process for only those ones of the neighbor cells presently ranked $1^{st}$ through $(AMT_{Track})^{TH}$ (step 411).

The strategy adopted in this exemplary embodiment is to track the same number of neighbor cells ($AMT_{Track}$) for so long as the same neighbor cell is the present candidate for cell reselection. However, when a different neighbor cell becomes the strongest neighbor cell (and therefore becomes the present candidate for cell reselection), it is desired to know how quickly that neighbor cell rose to the position of "first". This information, in turn, influences the decision about how many neighbor cells to track.

Figure 5:
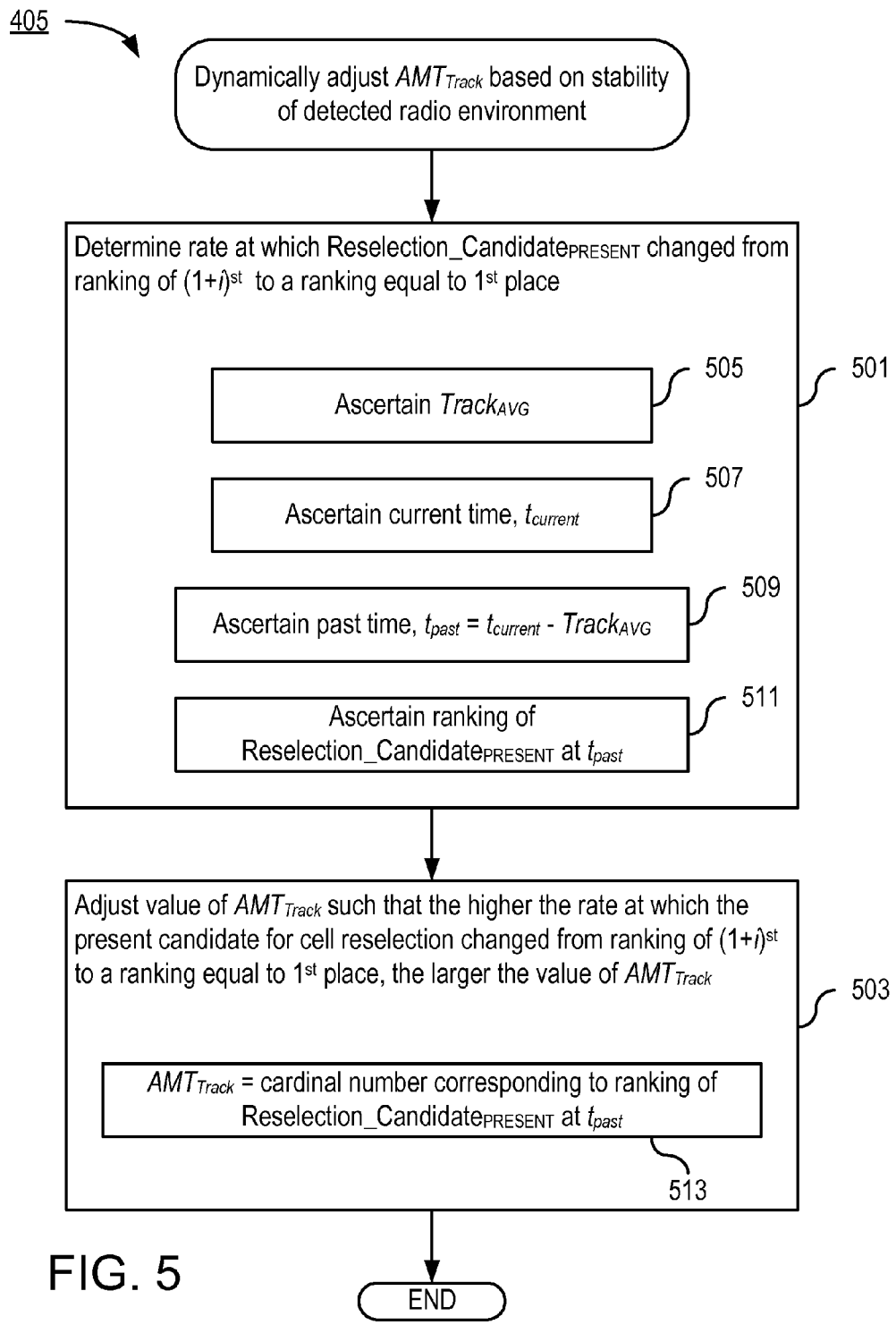
FIG. 5 is, in one respect, a flow diagram of processes that are performed by UE circuitry to perform the dynamic adjustment of the number of neighbor cells to track (i.e., adjustment of the variable $AMT_{Track}$).

This aspect is now discussed in connection with FIG. 5, which is, in one respect, a flow diagram of processes that are performed by UE circuitry to perform the dynamic adjustment of the number of neighbor cells to track (i.e., adjustment of the variable $AMT_{Track}$) (step 405) in accordance with a number of exemplary embodiments consistent with the invention. In another respect, FIG. 5 is a block diagram of circuitry 405 in a UE (e.g., the UE 103) comprising circuitry configured to carry out the described functions. To take a non-limiting example, each illustrated block of circuitry can be implemented by means of a one or more processors combined with suitable program code adapted to cause the one or more processors to carry out the described function(s).

In one aspect, dynamic adjustment of the variable $AMT_{Track}$ involves determining a rate at which the ranking of the present candidate for cell reselection changed from a ranking of $(1+i)^{TH}$ (i.e., a ranking indicating that the neighbor cell did not have the strongest receive level) to a ranking equal to $1^{st}$ (i.e., a ranking indicating that the neighbor cell has the strongest receive level and is now the present candidate for cell reselection), wherein i is an integer greater than or equal to 1 (step 501). The value of $AMT_{Track}$ is then adjusted such that the higher the rate at which the present candidate for cell reselection changed from the ranking of $(1+i)^{TH}$ to the ranking equal to $1^{st}$, the larger the value of $AMT_{Track}$ (step 503).

These processes can be carried out in a number of different ways. In some exemplary embodiments consistent with the invention, determining the rate at which the ranking of the present candidate for cell reselection changed from the ranking of $(1+i)^{TH}$ to the ranking equal to $1^{st}$ comprises ascertaining the ranking that the present candidate for cell reselection had at a past time, $t_{past}$, wherein the past time, $t_{past}$, is a predetermined amount of time prior to the current time, $t_{current}$. The closer the past ranking is to the present ranking of first position, the more slowly the candidate for cell reselection changed rankings, and hence the more stable the UE's current radio environment is. Similarly, the more distant the past ranking is from the present ranking of first position, the more quickly the candidate for cell reselection changed rankings, and hence the less stable the UE's current radio environment is.

The predetermined amount of time can be selected in any number of ways. In some exemplary embodiments, the predetermined amount of time is chosen to be the average amount of time it takes to track a single neighbor cell, $Track_{AVG}$. It will be understood that this is an average taken over all cells; there is not a different average tracking time per cell. The averaging can be obtained, for example, by means of an Infinite Impulse Response (IIR) with only two values (current and previous) equally weighted. As this is only an example, however, it will be further understood that averaging can be performed by any other type of filter (e.g. a Finite Impulse Response—FIR—filter) and/or weighting can be performed in any other way. A rationale for selecting the average amount of time it takes to track a single neighbor cell as the predetermined amount of time is that a neighbor cell that has newly moved up in ranking to the $(AMT_{Track})^{TH}$ position could, within the predetermined amount of time, move up further to the $1^{st}$ place position within the ranking. It is therefore beneficial to get information collection invoked as soon as possible for such a cell and to have enough time to actually collect the information for that cell before it (possibly) actually finds itself in the $1^{st}$ place position.

In the exemplary embodiments, the tracking time is taken to mean the time it takes to perform BSIC identification plus the time it takes to capture the relevant BCCH information from a neighbor cell. Note that the BSIC check mentioned earlier is really two types of checks: the first time a cell is found, an initial BSIC identification is performed. Subsequent BSIC checks on the same neighbor cell incorporate a faster BSIC re-identification process that is much quicker to perform. For example, initial BSIC identification can take twice as long or longer than the BSIC re-identification process. Although different embodiments can take different approaches, the exemplary embodiment is assumed to take into account the longer of these two types of tracking times (i.e. initial BSIC identification) just to be more conservative.

Some embodiments can predetermine an average tracking time, and use this consistently. However, it is advantageous to dynamically determine an actual average value instead of relying on a fixed calculated value because this will better cover actual operating conditions that can arise, such as when a UE is situated in an area with poor coverage and experiences problems in the BSIC identification and/or BCCH capturing processes. Solely as a non-limiting example, it is further mentioned that the two steps of BSIC identification and BCCH capturing for a neighbor cell can in theory be up to 1.6 seconds.

Returning now to a consideration of FIG. 5, exemplary embodiments that use the average tracking time, $Track_{AVG}$, are now further described. In particular, determining the rate at which the present candidate for cell reselection changed from a ranking of $(1+i)^{ST}$ to a ranking equal to $1^{st}$ place can comprise ascertaining an average amount of time it takes to track a single neighbor cell, $Track_{AVG}$, as described above (step 505). A current time value, $t_{current}$, is also ascertained (step 507) so that a past point in time, $t_{past}$, can be ascertained as $$t_{past} = t_{current} - Track_{AVG}$$

(step 509).

The past point in time, $t_{past}$, can be used as an index into the stored history (see, e.g., step 305) that has been maintained for the present candidate for cell reselection to ascertain the ranking that the present candidate for cell reselection had at the point in time $t_{past}$ (step 511).

Regarding adjustment of the number of neighbor cells to track, $AMT_{Track}$, it will be recalled that this is performed such that the higher the rate at which the present candidate for cell reselection changed from a ranking of $(1+i)^{st}$ to a ranking equal to $1^{st}$ place, the larger the value of $AMT_{Track}$. This can be accomplished by setting the value of $AMT_{Track}$ equal to the cardinal number corresponding to the ranking that the present candidate for cell reselection had at the past point in time, $t_{past}$ (step 513).

Figure 6:
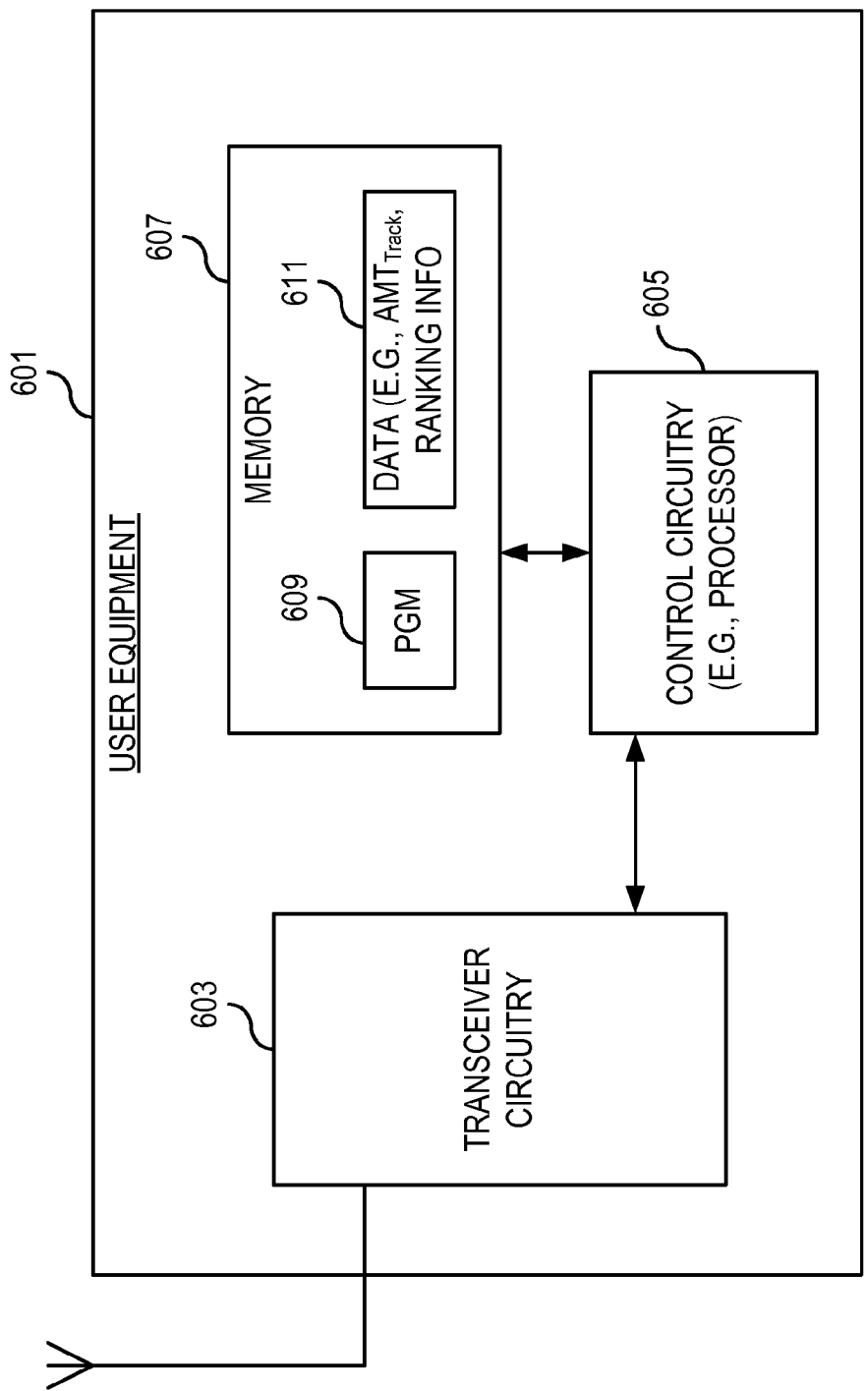
FIG. 6 is a block diagram of an exemplary UE comprising circuitry configured to carry out the various aspects of the invention.

FIG. 6 is a block diagram of an exemplary UE 601 comprising circuitry configured to carry out the various aspects of the invention. The UE 601 comprises transceiver circuitry 603 that can be configured in any known way to enable the UE 601 to be served by a cellular communication system base station or equivalent communication system network node. Such circuitry is well known in the art and therefore need not be described here in further detail.

The UE 601 further includes control circuitry 605 that is configured to carry out the various aspects of the invention as described herein, for example with reference to FIGS. 2, 3, 4, and 5. The control circuitry can be implemented in any number of ways using well-known design techniques, using the desired functionality as a starting point. As one non-limiting example, the control circuitry 605 can be implemented as one or more programmable processors. To facilitate this and other types of embodiments, the UE 601 further includes one or more memory devices (illustrated in FIG. 6 as the memory 607). In programmable implementations, the memory 607 includes one or more sets of program instructions configured for execution by the one or more processors to cause the one or more processors to carry out the various functions described herein.

In programmable as well as non-programmable implementations (e.g., hard-wired implementations using, for example, discreet logic gates) it is advantageous to have a memory device to include data 611 (e.g., $AMT_{Track}$, ranking information associated with the neighbor cells, timestamp information) generated by the functions described herein.

The control circuitry is configured to exchange control signals and data with the transceiver circuitry 603 and memory 607.

Various embodiments of the invention enable UEs to operate with reduced processing and battery power consumption because fewer neighbor cells are tracked while in idle mode. The number of neighbor cells to be tracked is adapted to the radio environment that the UE finds itself in, so that performance can be comparable to that which would be received if a conventional tracking approach, using more power and processing resources, had been employed.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of tracking neighbor cells of a user equipment operating in a serving cell in a mobile communication system, the method comprising:

operating the user equipment to periodically perform a signal measurement process that comprises:

ascertaining a received signal level for each of a number of the neighbor cells;

comparing the received signal levels with one another to ascertain, for each of the neighbor cells, a present ranking indicative of the neighbor cell's received signal level relative to the received signal levels of other neighbor cells, wherein a neighbor cell having the strongest received signal level has a ranking of "first" and is denoted a present candidate for cell reselection;

for each of the neighbor cells, comparing the present ranking with a previous ranking of the neighbor cell and if the present ranking and the previous ranking are not the same, then associating a timestamp with the neighbor cell, wherein the timestamp indicates a time that the neighbor cell's present ranking was ascertained; and ascertaining whether the ranking of any neighbor cell has changed from an earlier ranking of $(AMT_{Track}+m)^{TH}$ strongest received signal level to a present ranking equal to $(AMT_{Track})^{TH}$ strongest received signal level, wherein $(\ldots)^{TH}$ represents an ordinal number corresponding to a cardinal number "$\ldots$", $AMT_{Track}$ is a cardinal integer representing a number of neighbor cells being tracked and having a value that is greater than or equal to 1, and m is a cardinal integer greater than or equal to 1, and if the ranking of any neighbor cell has changed from the earlier ranking of $(AMT_{Track}+m)^{TH}$ strongest received signal level to a present ranking equal to $(AMT_{Track})^{TH}$ strongest received signal level then, without waiting for a previously scheduled time for invoking an information collectiong process, invoking the information collection process to be performed for the neighbor cell having the present ranking equal to $(AMT_{Track})^{TH}$ strongest received signal level; and operating the user equipment to periodically perform a neighbor tracking process that comprises:

ascertaining whether the present candidate for cell reselection is a same one of the neighbor cells as a previous candidate for cell reselection;

if the present candidate for cell reselection is the same as the previous candidate for cell reselection then performing an information collection process for only those ones of the neighbor cells presently ranked first through $(AMT_{Track})^{TH}$; and if the present candidate for cell reselection is not the same as the previous candidate for cell reselection then performing a tracking adjustment process followed by the information collection process for only those ones of the neighbor cells presently ranked first place through $(AMT_{Track})^{TH}$, wherein the tracking adjustment process comprises:

determining a rate at which the ranking of the present candidate for cell reselection changed from a ranking of $(1+i)^{TH}$ to a ranking equal to $1^{st}$, wherein i is an integer greater than or equal to 1; and adjusting the value of $AMT_{Track}$ in a manner that satisfies a relationship wherein the higher the rate at which the present candidate for cell reselection changed from the ranking of $(1+i)^{TH}$ to the ranking equal to $1^{st}$, the larger the value of $AMT_{Track}$.

2. The method of claim 1, wherein operating the user equipment to periodically perform the signal measurement process comprises ascertaining whether the ranking of any neighbor cell has changed from an earlier ranking of $(AMT_{Track}+m)^{TH}$ strongest received signal level to a present ranking of $(AMT_{Track}-n)^{TH}$ strongest received signal level, wherein n is an integer greater than or equal to 1, and if the ranking of any neighbor cell has changed from the earlier ranking greater of $(AMT_{Track}+m)^{TH}$ strongest received signal level to the present ranking of $(AMT_{Track}-n)^{TH}$ strongest received signal level then, without waiting for a previously scheduled time for invoking an information collection process, invoking the information collection process to be performed for the neighbor cell having the present ranking of $(AMT_{Track}-)^{TH}$ strongest received signal level.

3. The method of claim 1, wherein:
determining the rate at which the ranking of the present candidate for cell reselection changed from the ranking of $(1+i)^{TH}$ to a ranking equal to $1^{st}$ comprises:
ascertaining a current time value $t_{current}$;
ascertaining a past time value, $t_{past}$, that occurred a predetermined amount of time prior to the current time; and
ascertaining the ranking that the present candidate for cell reselection had at the past time, $t_{past}$; and
adjusting the value of $AMT_{Track}$ such that the higher the rate at which the present candidate for cell reselection changed from the ranking of $(1+i)^{TH}$ to the ranking equal to $1^{st}$, the larger the value of $AMT_{Track}$ comprises:
setting $AMT_{Track}$ to a value representing the cardinal number corresponding to the ranking that the present candidate for cell reselection had at the past time, $t_{past}$.

4. The method of claim 3, comprising determining the predetermined amount of time by ascertaining an average amount of time it takes to perform the information collection process for one neighbor cell.

5. The method of claim 1, wherein the information collection process comprises, for any one of the neighbor cells, obtaining a base station identification code and capturing broadcast control channel information that has been broadcast by the neighbor cell.

6. The method of claim 1, wherein the step of adjusting the value of $AMT_{Track}$ comprises capping the value of $AMT_{Track}$ to no more than a fixed maximum amount of neighbor cells to be tracked.

7. The method of claim 6, wherein the fixed maximum number of neighbor cells to be tracked is equal to six.

8. The method of claim 1, wherein the step of adjusting the value of $AMT_{Track}$ comprises ensuring that the value of $AMT_{Track}$ is not lower than a predefined fixed minimum amount of neighbors to be tracked.

9. The method of claim 8, wherein the predefined fixed minimum amount of neighbors to be tracked is two.

10. An apparatus for tracking neighbor cells of a user equipment operating in a serving cell in a mobile communication system, the apparatus comprising:
circuitry configured to operate the user equipment to periodically perform a signal measurement process that comprises:
ascertaining a received signal level for each of a number of the neighbor cells;
comparing the received signal levels with one another to ascertain, for each of the neighbor cells, a present ranking indicative of the neighbor cell's received signal level relative to the received signal levels of other neighbor cells, wherein a neighbor cell having the strongest received signal level has a ranking of "first" and is denoted a present candidate for cell reselection;
for each of the neighbor cells, comparing the present ranking with a previous ranking of the neighbor cell and if the present ranking and the previous ranking are not the same, then associating a timestamp with the neighbor cell, wherein the timestamp indicates a time that the neighbor cell's present ranking was ascertained; and
ascertaining whether the ranking of any neighbor cell has changed from an earlier ranking of $(AMT_{Track}+m)^{TH}$ strongest received signal level to a present ranking equal to $(AMT_{Track})^{TH}$ strongest received signal level, wherein $(\ldots)^{TH}$ represents an ordinal number corresponding to a cardinal number "$\ldots$", $AMT_{Track}$ is a cardinal integer representing a number of neighbor cells being tracked and having a value that is greater than or equal to 1, and m is a cardinal integer greater than or equal to 1, and if the ranking of any neighbor cell has changed from the earlier ranking of $(AMT_{Track}+m)^{TH}$ strongest received signal level to a present ranking equal to $(AMT_{Track})^{TH}$ strongest received signal level then, without waiting for a previously scheduled time for invoking an information collection process, invoking an information collection process to be performed for the neighbor cell having the present ranking equal to $(AMT_{Track})^{TH}$ strongest received signal level; and circuitry configured to operate the user equipment to periodically perform a neighbor tracking process that comprises:
ascertaining whether the present candidate for cell reselection is a same one of the neighbor cells as a previous candidate for cell reselection;
if the present candidate for cell reselection is the same as the previous candidate for cell reselection then performing an information collection process for only those ones of the neighbor cells presently ranked first through $(AMT_{Track})^{TH}$; and
if the present candidate for cell reselection is not the same as the previous candidate for cell reselection then performing a tracking adjustment process followed by the information collection process for only those ones of the neighbor cells presently ranked first place through $(AMT_{Track})^{TH}$, wherein the tracking adjustment process comprises:

determining a rate at which the ranking of the present candidate for cell reselection changed from a ranking of $(1+i)^{TH}$ to a ranking equal to $1^{st}$, wherein i is an integer greater than or equal to 1; and adjusting the value of $AMT_{Track}$ in a manner that satisfies a relationship wherein the higher the rate at which the present candidate for cell reselection changed from the ranking of $(1+i)^{TH}$ to the ranking equal to $1^{st}$, the larger the value of $AMT_{Track}$.

11. The apparatus of claim 10, wherein the circuitry configured to operate the user equipment to periodically perform the signal measurement process comprises circuitry configured to ascertain whether the ranking of any neighbor cell has changed from an earlier ranking of $(AMT_{Track}+m)^{TH}$ strongest received signal level to a present ranking of $(AMT_{Track}-n)^{TH}$ strongest received signal level, wherein n is an integer greater than or equal to 1, and if the ranking of any neighbor cell has changed from the earlier ranking greater of $(AMT_{Track}$ strongest received signal level to the present ranking of $(AMT_{Track}-n)^{TH}$ strongest received signal level then, without waiting for a previously scheduled time for invoking an information collection process, to invoke the information collection process to be performed for the neighbor cell having the present ranking of $(AMT_{Track}-n)^{TH}$ strongest received signal level.

12. The apparatus of claim 10, wherein:

determining the rate at which the ranking of the present candidate for cell reselection changed from the ranking of $(1+i)^{TH}$ to a ranking equal to $1^{st}$ comprises:

ascertaining a current time value $t_{current}$;

ascertaining a past time value, $t_{past}$, that occurred a predetermined amount of time prior to the current time; and ascertaining the ranking that the present candidate for cell reselection had at the past time, $t_{past}$; and adjusting the value of $AMT_{Track}$ such that the higher the rate at which the present candidate for cell reselection changed from the ranking of $(1+i)^{TH}$ to the ranking equal to $1^{st}$, the larger the value of $AMT_{Track}$ comprises:

setting $AMT_{Track}$ to a value representing the cardinal number corresponding to the ranking that the present candidate for cell reselection had at the past time, $t_{past}$.

13. The apparatus of claim 12, comprising circuitry configured to determine the predetermined amount of time by ascertaining an average amount of time it takes to perform the information collection process for one neighbor cell.

14. The apparatus of claim 10, wherein the information collection process comprises, for any one of the neighbor cells, obtaining a base station identification code and capturing broadcast control channel information that has been broadcast by the neighbor cell.

15. The apparatus of claim 10, wherein adjusting the value of $AMT_{Track}$ comprises capping the value of $AMT_{Track}$ to no more than a fixed maximum amount of neighbor cells to be tracked.

16. The apparatus of claim 15, wherein the fixed maximum number of neighbor cells to be tracked is equal to six.

17. The apparatus of claim 10, wherein the adjusting the value of $AMT_{Track}$ comprises ensuring that the value of $AMT_{Track}$ is not lower than a predefined fixed minimum amount of neighbors to be tracked.

18. The apparatus of claim 17, wherein the predefined fixed minimum amount of neighbors to be tracked is two.

* * * * *

UNITED STATES PATENT AND TRADEMARK OFFICE
CERTIFICATE OF CORRECTION

| | | |
|---|---|---|
| PATENT NO. | : 8,185,115 B2 | Page 1 of 1 |
| APPLICATION NO. | : 12/765951 | |
| DATED | : May 22, 2012 | |
| INVENTOR(S) | : Nader | |

It is certified that error appears in the above-identified patent and that said Letters Patent is hereby corrected as shown below:

In Column 1, Line 10, delete "system" and insert -- system. --, therefor.

In Column 2, Line 42, delete "wherein" and insert -- wherein $(...)^{TH}$ --, therefor.

In Column 2, Line 66, delete "$(AMT_{Truck})^{TH}$." and insert -- $(AMT_{Track})^{TH}$. --, therefor.

In Column 3, Line 3, delete "$AMT_{Truck}$" and insert -- $AMT_{Track}$ --, therefor.

In Column 3, Line 29, delete "$AMT_{Truck}$" and insert -- $AMT_{Track}$ --, therefor.

In Column 12, Line 59, in Claim 1, delete "collectiong" and insert -- collection --, therefor.

In Column 13, Line 37, in Claim 2, delete "$(AMT_{Track}-)^{TH}$" and insert -- $(AMT_{Track}-n)^{TH}$ --, therefor.

In Column 15, Line 19, in Claim 11, delete "$(AMT_{Track}$" and insert -- $(AMT_{Track}+m)^{TH}$ --, therefor.

Signed and Sealed this
Twenty-third Day of October, 2012

David J. Kappos
*Director of the United States Patent and Trademark Office*